US006542473B1

(12) United States Patent
Song

(10) Patent No.: US 6,542,473 B1
(45) Date of Patent: Apr. 1, 2003

(54) ARRANGEMENT AND A METHOD RELATING TO TRANSMISSION SYSTEMS

(75) Inventor: Jack Zeyu Song, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/319,416

(22) PCT Filed: Dec. 2, 1997

(86) PCT No.: PCT/SE97/02019

§ 371 (c)(1),
(2), (4) Date: Aug. 27, 1999

(87) PCT Pub. No.: WO98/27695

PCT Pub. Date: Jun. 25, 1998

(30) Foreign Application Priority Data

Dec. 5, 1996 (SE) .............................................. 9604491

(51) Int. Cl.[7] .............................................. H04L 12/28
(52) U.S. Cl. .................................. 370/254; 370/395.31
(58) Field of Search ........................ 370/395.1, 395.51, 370/408, 254, 256, 351, 389, 395.3, 395.31; 709/242, 239

(56) References Cited

U.S. PATENT DOCUMENTS

| 5,452,292 | A | * | 9/1995 | Okanoue et al. ............ 370/403 |
| 5,517,617 | A | * | 5/1996 | Sathaye et al. ............. 709/222 |
| 5,602,839 | A | * | 2/1997 | Annapareddy et al. ..... 370/405 |
| 5,831,975 | A | * | 11/1998 | Chen et al. .................. 370/256 |
| 5,831,982 | A | * | 11/1998 | Hummel ..................... 370/351 |
| 6,078,575 | A | * | 6/2000 | Dommety et al. .......... 370/338 |
| 6,115,753 | A | * | 9/2000 | Joens ......................... 370/256 |
| 6,304,549 | B1 | * | 10/2001 | Srinivasan et al. ......... 370/230 |

FOREIGN PATENT DOCUMENTS

| EP | 0 637 152 A1 | 2/1995 | |
| EP | 0 639 911 A1 | 2/1995 | |
| EP | 0 835 034 A2 | * 8/1998 | ............ H04Q/7/24 |
| WO | WO 95/18498 | 7/1995 | |

OTHER PUBLICATIONS

Socolofsky, Request for Comments: 1180 A TCP/IP Tutorial, Jan. 1991.*

Baratz, Alan E. et al., "Establishing Virtual Circuits in Large Computer Networks." Computer Networks and ISDN Systems, No. 12 (1986), pp. 27–37.

* cited by examiner

Primary Examiner—David Vincent

(57) ABSTRACT

An arrangement and method for choosing a route in a hierarchical transmission system including a plurality of interconnected nodes includes generating local routing tables in which routes between nodes on the same hierarchical level are saved and global routing tables in which routes between nodes on different hierarchical levels are saved. A route is chosen from the routing tables in response to a request for a connection between a source node and a destination node.

11 Claims, 4 Drawing Sheets

Local routing table from
Node A.1.1.

| Level | Destination Node | Route |
|---|---|---|
| 2 | B | A ⟶ B/100 |
| 1 | A.2 | A.1 ⟶ A.2/2 |
|   | A.3 | A.1 ⟶ A.2 ⟶ A.3/12 |
| 0 | A.1.2 | A.1.1 ⟶ A.1.2/1 |
|   |       | A.1.1 ⟶ A.1.3 ⟶ A.1.2/3 |
|   | A.1.3 | A.1.1 ⟶ A.1.3/2 |
|   |       | A.1.1 ⟶ A.1.2 ⟶ A.1.3/2 |

Fig. 3

Global routing table from
Node A.1.1.

| Level | Destination Node | Route |
|---|---|---|
| 2 | B | A.1.1 → A.2 → A.3 → B/112 |
|   |   | A.1.1 → A.1.3 → A.2 → A.3 → B/115 |
| 1 | A.2 | A.1.1 → A.2/2 |
|   |   | A.1.1 → A.1.3 → A.2/5 |
|   | A.3 | A.1.1 → A.2 → A.3/12 |
|   |   | A.1.1 → A.1.3 → A.2 → A.3/15 |
| 0 | A.1.2 | A.1.1 → A.1.2/1 |
|   |   | A.1.1 → A.1.3 → A.1.2/3 |
|   | A.1.3 | A.1.1 → A.1.3/2 |
|   |   | A.1.1 → A.1.2 → A.1.3/2 |

Fig. 4

ARRANGEMENT AND A METHOD RELATING TO TRANSMISSION SYSTEMS

FIELD OF THE INVENTION

The present invention relates to an arrangement and to a method for finding a route from a source node to a destination node in a transmission system at the lowest cost and in the quickest way possible.

BACKGROUND OF THE INVENTION

Various conceivable routes between a source node and a destination node can be compared in a routing procedure before the optimal route between said source node and destination node is determined in a transmission system. A number of such procedures are described in the literature.

EP-A 1 637 152 describes a method and an arrangement for speeding-up route selection in a packet switching network. The method comprises selecting certain network nodes as so-called backbone nodes, with the remaining nodes being so-called local nodes. The nodes chosen as backbone nodes are those nodes that have the most connections to other nodes in the network. The local nodes are coupled to at least one backbone node.

The backbone nodes and the local nodes are chosen at the time of configuring the network. The intention of this concept is to convert a normal network to an abstract hierarchical network having two levels, a backbone level and a local level, when calculating conceivable routes between two nodes.

One problem with this solution is that the choice of backbone nodes is critical for the speed at which routes are selected in the network. The subset in which the backbone nodes are located must be selected correctly in order for the choice of route to be effected as quickly and as effectively as possible.

SUMMARY OF THE INVENTION

In accordance with the Private Network-Network Interface (PNNI) specification, an ATM-network topology can be described with the aid of nodes and links. A Peer Group (PG) is a collection of nodes on a common level. A node that is located on level[i], where I>0, represents a PG on level[i−1].

A route in an ATM-network is defined as starting at a start node, a so-called source node, on level[0], and then either passing no nodes or several nodes via links between said nodes, and finally terminating at an end node, a so-called destination node. All nodes in the route may be on any level whatsoever, with the exception of the start node which is always on level[0]. Links from a node that is on level[i] to a node that is on level[j], where i>j≧0 is not permitted, because the link between two nodes must either be between two nodes on the same level or from a node that is on a lower level to a node that is on a higher level. Neither is it permitted for a route to pass a node more than once.

The possible routes from the source node to all destination nodes in the network are normally pre-calculated. These routes are saved in a data structure in order to reduce the time taken to establish a connection. In the event of a call, the source node shall chose an appropriate route from among all possible routes to the destination node in the data structure. The number of possible routes from a source node to a destination node can vary from one to any number whatsoever.

The present invention addresses a problem concerning the quickest and most effective manner in which possible routes from a start node to a destination node can be calculated.

The inventive method comprises two principle method steps. One or more so-called local routes are generated in a first main step, while one or more so-called global routes are generated in a second main step. In order to be able to generate the local routes and the global routes, it is necessary for the start node to have access to the topology of the network as seen outside itself. The generated local and global routes are saved in tables on different levels and said levels are coupled to the hierarchical levels in the network.

A local route on level[0] always starts at the start node or so-called source node and terminates at another node in the same Peer Group, PG. A local route on level[i], where i>0, always starts from a so-called ancestor node and terminates at another ancestor node in the same PG. All conceivable local routes can be generated separately for each level in the network and are saved in local routing tables. These local routing tables can be generated in any desired order, that is the local routing table for level[i] can be generated before level [j] irrespective of whether i>j or i<j. It is also conceivable for the local routing tables to be generated in parallel with respect to level.

A global route to a node on level[0] is the same as a local route to the same node on level[0], that is the route starts from the source node and terminates at an arbitrary node on level[0]. A global route to a node on level[i], where i>0, always starts at the source node on level[0] and terminates at said node on level[i]. The global route to a node on a level[i], where i>0 passes different levels in the network hierarchy.

Global routes to nodes on different levels in the network must be generated from a lower level in the network to a higher level therein, i.e. must begin from level[0] and then level[1], level[2] and so on. The reason why routes must be generated in this order is because when generating a global route to a node on level[i], where i>0, at least two routes are combined, a local route on level[i] and at least one global route on level[j], where j<i. The local route can be conceived as describing the route from the ancestor node to the destination node, whereas the global route can be conceived as describing the route within said ancestor node, i.e. the route from the source node to a boarder node. A boarder node is characterized by including a link to another Peer Group.

The generation of a global routing table[i], where i>0, always requires, on the one hand, information from the local routing table on level[i] and, on the other hand, information from one or more global routing tables[j], where i>j≧0. In other words, the generation of a global routing table[2] requires information from the local routing table[2], the global routing table[0] and the global routing table[1], or from the local routing table[2] and the global routing table [1], or from the local routing table[2], and from the global routing table[0].

A number of different methods can be conceivably applied for generating the local and global routing tables. The Dijkstra algorithm may be one such method. Different methods may be used to generate different routing tables. For instance, it is conceivable to use one method for generating a local routing table[i] and another method for generating a local table[j], where i≠j.

Accordingly, the present invention is aimed towards speeding-up the choice of route in a transmissions system, and then particularly in a telecommunications network, more particularly an ATM-network.

One advantage afforded by the present invention is that it gives a small overhead. This is because all local routes are generated only once and saved in local routing tables. Global routes can be generated with the aid of pointers to the local routes, in order to eliminate the risk of duplicate copies.

Another advantage afforded by the present invention is that the local routing tables can be generated in parallel.

Another advantage afforded by the present invention is that different methods can be used to generate local routing tables on different levels.

Still another advantage afforded by the present invention is that the model solely requires small modifications to the network structure, i.e. only a few routing tables will be affected by changes in the network.?

The invention will now be described in more detail with reference to preferred exemplifying embodiments thereof and also with reference to the accompanying drawings.

BRIEF DESCRIPTION OF THE DRAWINGS

FIG. 3 illustrates a local routing table according to the present invention for the network shown in FIG. 1.

FIG. 4 shows a global routing table according to the invention for the network shown in FIG. 1.

DESCRIPTION OF PREFERRED EMBODIMENTS

Figure 1:
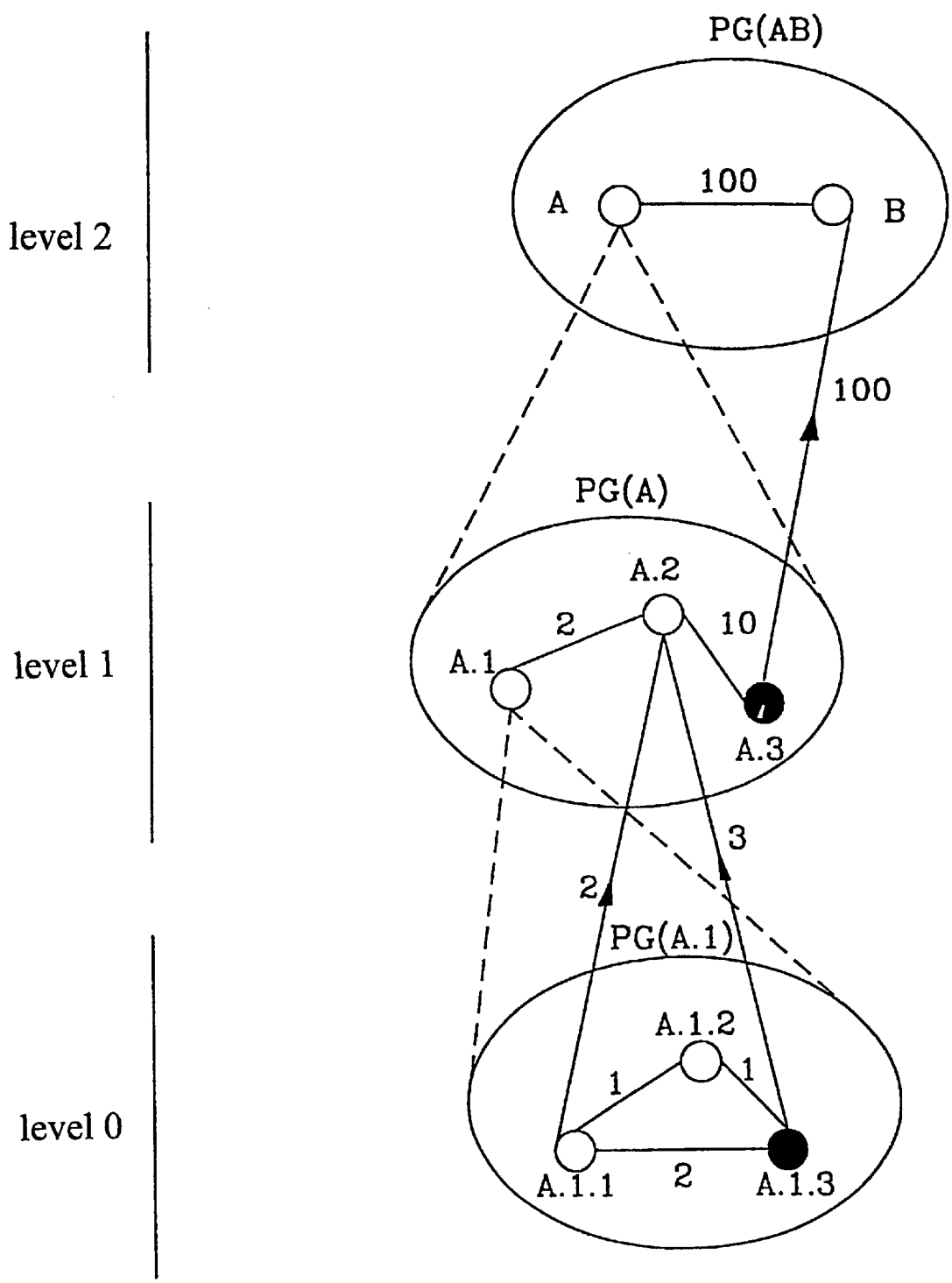
FIG. 1 represents a hierarchical network that has three levels.

Shown in FIG. 1 is a hierarchical network that includes three hierarchical levels. Only one Peer Group is shown on level 0, a so-called physical level. The physical Peer Group is referred to in the Figure as PG(A.1) and includes three nodes, node A.1.1, A.1.2 and A.1.3. So-called horizontal links are found between node A.1.1 and A.1.2, A.1.2 and A.1.3 and between the nodes A.1.3 and A.1.1. A horizontal link is characterized by a link that interconnects two nodes within the same PG. All nodes on level 0 are physical nodes. Nodes A.1.1 and A.1.3 are so-called boarder nodes, meaning that they include a physical link to another PG and therewith also include an abstract uplink to an abstract node in a PG on a higher level. PG(A.1) also includes a Peer Group Leader node, node A.1.3, represented by a solid circle and whose properties are well known to the person of average skill in this particular field and do not therefore need to be described in detail.

Level 1 includes a PG(A) that includes three nodes, node A.1, A.2 and A.3. Horizontal links are found between the nodes A.1 and A.2 and also between the nodes A.2 and A.3. Uplinks are found between PG(A) and PG(A.1). An uplink passes from node X to node Y, where node Y is disposed in a PG where an ancestor node to node X is found. Node X is thus a boarder node. Ancestor nodes represent their so-called child PG for nodes in other PG:s on lower levels. Node A.1 in FIG. 1 is an ancestor node to PG(A.1). It can be said that ancestor node A.1 is an approximate image of PG(A.1). The remaining nodes, that is node A.2 and A.3, in PG(A) are also ancestor nodes. For instance, node A.3 is a parent to a PG(A.3), not shown, that includes a number of nodes that can be called node A.3.1, A.3.2, A.3.3 and so on. The link between the nodes A.1.1 and A.2, and the link between the nodes A.1.3 and A.2 are uplinks. Node A.3 is both a Peer Group Leader and a boarder node at the same time. The PG Leader is shown as a solid circle, precisely the same as on level 0.

Figure 2:
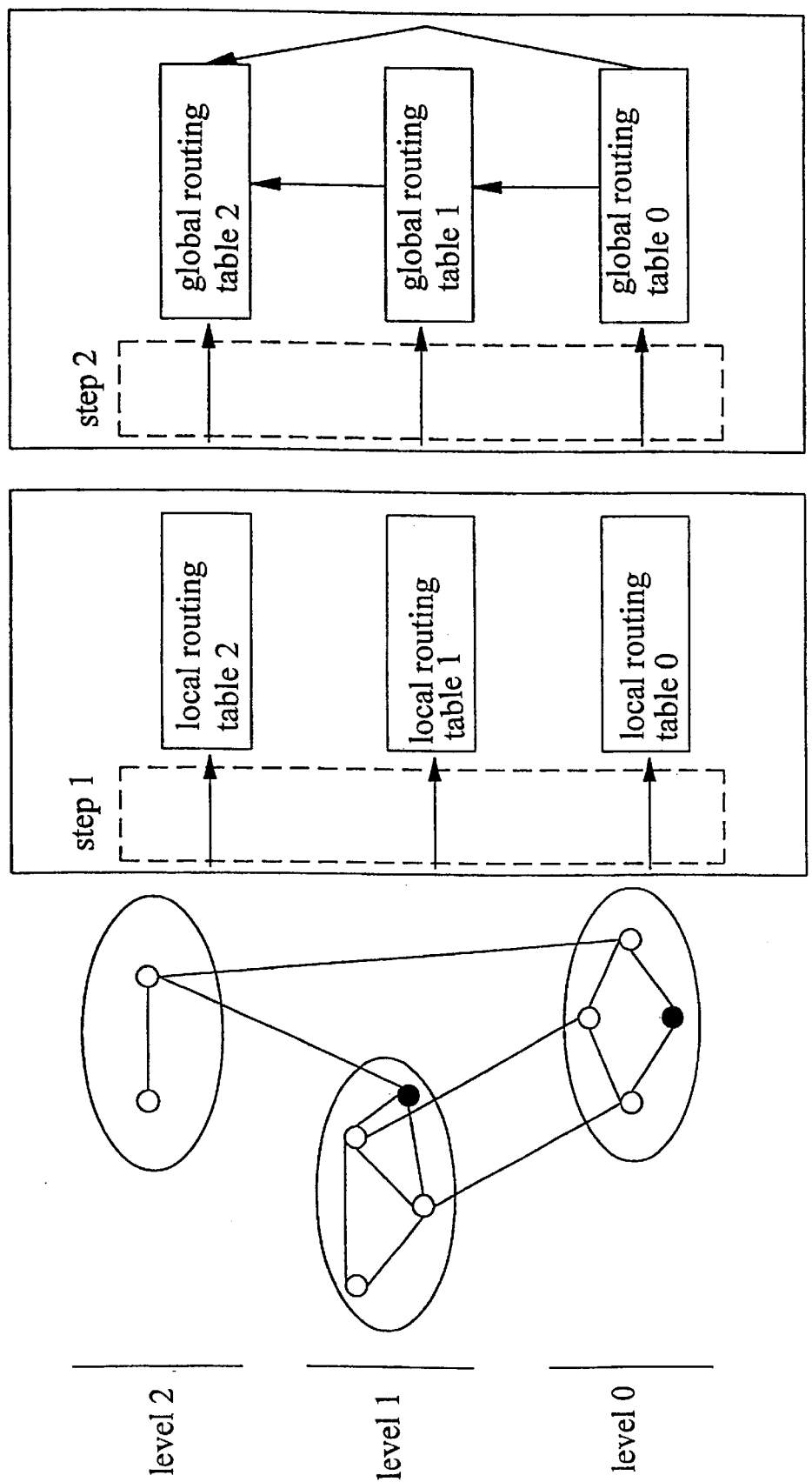
FIG. 2 hows how the various routing tables according to the invention are coupled to an arbitrary network structure.

A PG designated PG(AB) is found on level two, which is the highest level in the network shown in FIG. 2. This PG has two nodes, node A and node B. Node A is an ancestor node to PG(A) comprising the nodes A.1, A.2 and A.3 on level 1. Node A is thus an abstraction of the aforesaid nodes. No Peer Group Leader node is required on the highest level in the hierarchical network. The function of a Peer Group Leader node is to execute the function of its ancestor node. The highest level has no ancestor node and consequently the Peer Group Leader node becomes superfluous.

FIG. 2 shows how the various routing tables according to the invention are coupled to the hierarchical network structure shown in FIG. 1. The inventive method comprises two main steps, of which step one comprises the generation of local routing tables and step two comprises the generation of global routing tables.

A local routing table for level[0] can include all possible routes from the source node to each of the remaining nodes in one and the same Peer Group.

A local routing table for level[i], where i>0, can include all possible routes from the ancestor node of the source node to each of the remaining nodes in one and the same Peer Group.

A global routing table for level[i] can include all possible routes for the source node on level[0] to all nodes in the network on level[i] with the exception of the ancestor nodes of the source node.

A local routing table[0] is equivalent to a global routing table[0].

The local routing tables can be generated in any desired order. The local routing table[i] can be generated before the local routing table[j], irrespective of whether i>j or i<j. the local routing tables can also be generated in parallel, in other words all routing tables[i] can be generated simultaneously.

Different algorithms can be used to generate routing tables on different levels[i]. Examples of suitable algorithms in this respect are the Dijkstra algorithm, the Kruskal algorithm and the Floyd algorithm, among others. The choice of algorithm will depend on the configuration of the network and on the problem formulation. The Dijkstra algorithm is to be preferred when desiring to minimize the cost between two nodes in a network.

By cost between two network nodes may, for instance, mean the distance between the nodes, the bandwidth of the link between the nodes, or the link traffic between said nodes. Different costs are denoted in the network in FIG. 1 by the links between two nodes, partly in the same PG and partly between two nodes in different PGs.

It is necessary to commence the generation of the global routing tables from level[0], and then level[1] and so on. The reason why the global routing tables must be generated in this order is because global routes to a node arranged on a level[i], where i>0, will depend on the local routing table[i] and on at least one of the global routing tables[j], where j<i.

FIG. 3 shows a local routing table for node A.1.1. The table includes the best two routes for each destination node. On level[0] in PG(A.1), there are two different destination nodes for node A.1.1 to reach, node A.1.2 and node A.1.3. In this case, when the nodes in PG(A.1) are interconnected in a ring, there is found for each node two, and only two, possibilities for each node to reach the remaining nodes in the Peer Group.

The nodes in PG(A) are interconnected in line with each other on level 1. In this case, this type of interconnection affords to each node one possibility, and only one possibility, of reaching the remaining nodes in the Peer Group. These possibilities are presented in the table.

On level two in the local table, there is only one node that can be reached from the aspect of node A.1.1, namely node B. As before mentioned, this is because all routes on a level>0 start from the ancestor node.

All tabled routes on each level and to each node are arranged in a rising cost order.

FIG. 4 shows a global routing table from node A.1.1. The global routing table on level[0] is exactly the same as the local routing table on level[0].

On level[1], the global routing table includes information from the local routing table on level[1] and also from the global routing table on level[0]. The global routing table on level[1] for node A.1.1 includes the various routes calculated for reaching node A.2 and node A.3 in PG(A) on level[1] from node A.1.1 in PG(A.1) on level[0]. In the local routing table on level[1], node A.1 for node A.2 and A.3 have been replaced with the possible routes from node A.1.1 in PG(A.1) via uplinks to node A.2 and A.3 in PG(A). The global route on level[i] where i>0, can be said to define or specify the route in comparison with the local route on the same level. In order to obtain the cheapest route from the source node to the destination node when there is more than one uplink to one and the same node, it is necessary to mutually compare the best routes for each uplink.

On level[2], the global routing table includes information from the local routing table on level[2] and also information from the global routing table on level[1]. The global routing table on level[2] for node A.1.1 includes the various routes calculated for reaching node B in PG(AB) from the source node A.1.1 in PG(A.1) on level[0]. Node A for node B has been replaced in the local routing table on level[2] with the possible routes from node A.1.1 in PG(A.1) via uplinks to node B in PG(AB). It can also be said in this case, precisely as mentioned above with respect to level[1], that the global route on level[2] is a specification of the route in comparison with the local route on the same level. As in the earlier case, when several uplinks reach one and the same node on level[2], the routes for respective uplinks shall be compared with each other, so as to obtain the cheapest route.

It will be understood that the invention is not restricted to the aforedescribed and illustrated exemplifying embodiments thereof and that modifications can be made within the scope of the following claims.

What is claimed is:

1. A method for choosing a route in a hierarchical transmission system that includes a plurality of interconnected nodes, the method comprising the steps of:
   generating local routing tables, in which routes between nodes on a same hierarchical level are saved;
   generating global routing tables, in which routes between nodes on a different hierarchical level are saved; and
   choosing a route between a source node and a destination node, among the plurality of interconnected nodes, from the local and global routing tables in response to a connection request between the source node and the destination node;
   wherein the global routing table on a first hierarchical level is caused to depend on a local routing table on the first hierarchical level and on at least one global routing table on a second hierarchical level, the second hierarchical level being a lower hierarchical level than the first hierarchical level.

2. The method according to claim 1, wherein each level in the hierarchical network is provided with at least one local routing table.

3. The method according to claim 2, wherein each level in the hierarchical network is provided with a global routing table.

4. The method according to claim 1, wherein the global routing table on a lowest hierarchical level is equivalent to the local routing table on the lowest hierarchical level.

5. The method according to claim 1, wherein at least two different algorithms are used to generate routing tables in said hierarchical transmission system.

6. A hierarchical transmission system that includes a plurality of interconnected nodes divided into different peer groups, the transmission system comprising:
   means for generating local routing tables, in which routes between nodes on a same hierarchical level are saved;
   means for generating global routing tables, in which routes between nodes on a different hierarchical level are saved; and
   means for choosing a route between a source node and a destination node, among the plurality of interconnected nodes, from said routing tables in response to a request for connection between the source node and the destination node;
   wherein the global routing table on a first hierarchical level is arranged to depend on a local routing table on the first hierarchical level and on at least one global routing table on a second hierarchical level, the second hierarchical level being a lower hierarchical level than the first hierarchical level.

7. The hierarchical transmission system according to claim 6, wherein each local routing table on the first hierarchical level includes all possible routes from an ancestor node of the source node on the first hierarchical level to each of the remaining nodes in a same peer group.

8. The hierarchical transmission system according to claim 6, wherein each local routing table on the first hierarchical level includes a pre-selected number of cheapest routes from an ancestor node of the source node on the first hierarchical level to each of the remaining nodes in a same peer group.

9. The hierarchical transmission system according to claim 6, wherein each global routing table on the first hierarchical level includes all possible routes from a source node on a lowest hierarchical level to all nodes in the network on the first hierarchical level with the exception of ancestor nodes of the source node.

10. The hierarchical transmission system according to claim 6, wherein each global routing table on the first hierarchical level includes a pre-selected number of the cheapest routes from the source node on the lowest hierarchical level to all nodes on the first hierarchical level with the exception of ancestor nodes of the source node.

11. The hierarchical transmission system according to claim 6, wherein the system is arranged to use at least two algorithms to generate the routing tables on the various hierarchical levels.

* * * * *